(12) United States Patent
Miyagawa

(10) Patent No.: US 9,248,944 B2
(45) Date of Patent: Feb. 2, 2016

(54) WATERPROOF STRUCTURE, METHOD OF FORMING THE SAME, AND TERMINAL

(75) Inventor: Tatsuya Miyagawa, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/992,430

(22) PCT Filed: Nov. 2, 2011

(86) PCT No.: PCT/JP2011/006156
§ 371 (c)(1),
(2), (4) Date: Jun. 7, 2013

(87) PCT Pub. No.: WO2012/086115
PCT Pub. Date: Jun. 28, 2012

(65) Prior Publication Data
US 2013/0264225 A1    Oct. 10, 2013

(30) Foreign Application Priority Data

Dec. 21, 2010    (JP) ................................. 2010-284625

(51) Int. Cl.
*B65D 43/02* (2006.01)
*F16J 15/02* (2006.01)
*F16J 15/06* (2006.01)

(52) U.S. Cl.
CPC ............... *B65D 43/02* (2013.01); *F16J 15/024* (2013.01); *F16J 15/062* (2013.01)

(58) Field of Classification Search
CPC ... F16J 15/3204; F16J 15/322; F16J 15/3228; F16J 15/32; F16J 15/06; F16J 15/061; F16J 15/062; H05K 5/061
USPC .............. 277/587, 641, 644, 647; 206/37
See application file for complete search history.

(56) References Cited

U.S. PATENT DOCUMENTS

| 2,910,209 | A | * | 10/1959 | Nelson | 220/378 |
| 3,106,406 | A | * | 10/1963 | Liebig | 277/546 |
| 4,156,532 | A | * | 5/1979 | Kawaguchi et al. | 277/587 |
| 4,298,204 | A | * | 11/1981 | Jinkins | 277/641 |
| 5,160,474 | A | | 11/1992 | Huff | |
| 7,793,944 | B2 | * | 9/2010 | Otuka | 277/611 |

(Continued)

FOREIGN PATENT DOCUMENTS

| CN | 101675278 | 3/2010 |
| EP | 2236865 | 10/2010 |

(Continued)

OTHER PUBLICATIONS

International Search Report PCT/JP2011/006156 dated Jan. 24, 2012, with English translation.

(Continued)

*Primary Examiner* — Anthony Stashick
*Assistant Examiner* — Robert Poon
(74) *Attorney, Agent, or Firm* — Young & Thompson

(57) ABSTRACT

Provided is a waterproof structure capable of facilitating positioning of a packing. A waterproof structure according to one aspect of the present invention includes a first case having a groove formed therein, a packing that is disposed in the groove, a second case that pushes the packing and forms a sealed space with the first case. The packing includes a bending part, and the groove includes a guiding part that guides a tip of the bending part to a predetermined position on the bottom surface of the groove in the first case.

8 Claims, 12 Drawing Sheets

(56) References Cited

U.S. PATENT DOCUMENTS

| | | | |
|---|---|---|---|
| 8,783,694 B2 | 7/2014 | Matsuo | |
| 2004/0195783 A1 | 10/2004 | Akagi et al. | |
| 2010/0117309 A1* | 5/2010 | Yudovsky | 277/644 |
| 2010/0264606 A1 | 10/2010 | Hayashi | |

FOREIGN PATENT DOCUMENTS

| | | |
|---|---|---|
| GB | 2446598 | 2/2007 |
| JP | 10-154750 | 6/1998 |
| JP | 2005-127437 | 5/2005 |
| JP | 2006-220229 | 8/2006 |
| JP | 2007-321922 | 12/2007 |
| JP | 2008-248899 | 10/2008 |
| JP | 2008-249139 | 10/2008 |
| JP | 2010-124072 | 6/2010 |

OTHER PUBLICATIONS

JP Office Action dated Jul. 21, 2015, with partial English translation; Application No. 2012-549603.

Chinese Office Action, dated Dec. 2, 2014, in corresponding Chinese Patent Application No. 201180061467.1.

* cited by examiner

WATERPROOF STRUCTURE, METHOD OF FORMING THE SAME, AND TERMINAL

TECHNICAL FIELD

The present invention relates to a waterproof structure and a method of forming the same, and particularly to a waterproof structure used to form a sealed space by a first case and a second case and a method of forming the same.

BACKGROUND ART

When a sealed space is formed by a first case and a second case, it is common to dispose a packing 3 between a first case 1 and a second case 2, as shown in FIG. 1 That is, the packing 3 is disposed in a groove 11 formed in the first case 1. Then, the first case 1 and the second case 2 are bonded by bolts 4 with the packing 32 interposed therebetween.

In such a case, as shown in FIG. 11, the packing 3 is pushed by a protrusion 21 that is formed to the second case 2. Note that FIG. 11 illustrates the packing 3 in a state not pushed by the protrusion 21 of the second case 2. Therefore, the dashed line of FIG. 11 is a virtual line of the protrusion 21.

A large reaction force generated in the packing 3 when the packing 3 is compressed, as mentioned above, could raise the second case 2. For this reason, the packing 3 is devised to include a protrusion 31 formed thereto, so that when the packing 3 is pushed by the protrusion 21 of the second case 2, the protrusion 31 will not deform and generate a large reaction force as shown in FIG. 12.

However, even when the protrusion 31 is formed to the packing 3, a large reaction force is still generated in the packing 3. Therefore, as shown in FIGS. 11 and 12, a pawl 12 is formed to the first case 1, for example. A pawl 25 is formed also to the second case 2. Then, the pawl 12 of the first case 1 and the pawl 25 of the second case 2 are engaged to counter the reaction force and prevent the second case 2 from rising. Such a configuration causes an increase in the size of the cases due to the pawls formed to the both cases.

Incidentally, patent literature 1 discloses a technique of forming a sealed space by a first case and a second case using a gasket including protrusions on both upper and lower ends with their cross-sectional shapes protruding in the same direction and a middle protrusion on a substantially central part protruding in the same direction as the protrusions.

Moreover, patent literature 2 discloses a technique of forming a sealed space by a first case and a second case using a gasket including a lip part extending obliquely upward from a body with its cross-sectional shape being substantially elliptical.

CITATION LIST

Patent Literature

Patent literature 1: Japanese Unexamined Patent Application Publication No. H10-154750
Patent literature 2: Japanese Unexamined Patent Application Publication No. 2006-220229

SUMMARY OF INVENTION

Technical Problem

The techniques disclosed in patent literatures 1 and 2 are unable to easily determine a position of the gasket when the gasket disposed in a groove in the first case is pushed by the second case. Accordingly, a push by the second case may bend the protrusion and lip part in an unintended direction.

An objective of the present invention is to provide a waterproof structure to solve the abovementioned issue and a method of forming the same.

Solution to Problem

In an exemplary aspect of the present invention, a waterproof structure includes a first case having a groove formed therein, a packing that is disposed in the groove, and a second case that pushes the packing and forms a sealed space with the first case. The packing includes a bending part, and while the packing is not pushed by the second case, a contact point is disposed offset toward a bending direction of the bending part from a straight line, in which the contact point is between a tip of the bending part and a bottom surface of the groove in the first case, and the straight line passes through a bending point of the bending part and is substantially orthogonal to a contact surface of the second case to be in contact with the packing, and the groove includes a guiding part that guides the tip of the bending part to a predetermined position on the bottom surface of the groove in the first case.

In another exemplary aspect of the present invention, a method of forming a waterproof structure includes disposing a packing in a groove formed in a first case, guiding, by a guiding part of the first case, a tip of a bending part of the packing to a predetermined position on a bottom surface of the groove in the first case, and disposing a contact point offset toward a bending direction of the bending part from a straight line, in which the contact point is between the tip of the bending part of the packing and the bottom surface of the groove in the first case, and the straight line passes through a bending point of the bending part and is substantially orthogonal to a contact surface of the second case to be in contact with the packing, and pushing the packing by the second case, and forming a sealed space with the first case.

Advantageous Effects of Invention

According to the present invention, it is possible to provide the waterproof structure that facilitates positioning of the packing and the method of forming the same.

DESCRIPTION OF EMBODIMENTS

A waterproof structure according to exemplary embodiments of the present invention and a method of forming the same are explained. However, the present invention is not necessarily limited to the following exemplary embodiments. Moreover, following description and drawings are simplified as appropriate for clarity of the explanation. In addition, an up-and-down direction in the following explanation is based on the drawings and changes according to the usages.

[First Exemplary Embodiment]

A waterproof structure according to a first exemplary embodiment and a method of forming the same are explained. The waterproof structure and the method of forming the same according to this exemplary embodiment can be preferably used for a waterproof structure of electronic devices such as cell phones, smartphones, PDAs (Personal Digital Assistants), and tablet PCs (Personal Computers).

Figure 1:
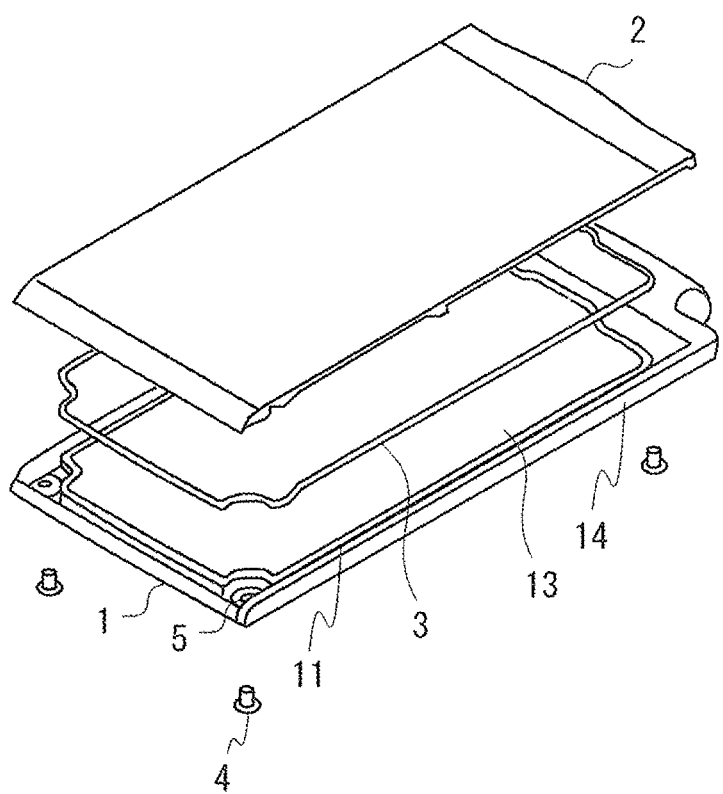
FIG. 1 is a structural drawing schematically showing a common waterproof structure.

This waterproof structure has similar components as a common waterproof structure. Specifically, the waterproof structure includes a first case 1, a second case 2, and a packing 3, as shown in FIG. 1.

The first case 1 has an opening in an upper surface (may be a lower surface). The first case 1 has a space 13 capable of mounting inside an electronic substrate, a display device and the like for realizing functions of the electronic devices, for example. A riser part 14 is formed to surround the space 13.

Figure 2:
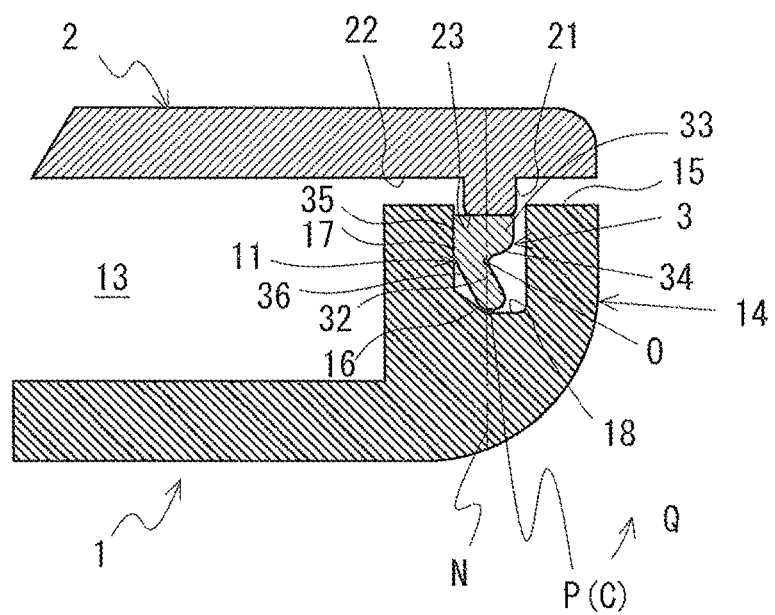
FIG. 2 is a cross-sectional diagram showing a state before a second case pushes a packing in a waterproof structure according to a first exemplary embodiment of the present invention.

An upper surface 15 of the riser part 14 is formed in a plane, as shown in FIG. 2. The riser part 14 has a sufficient width dimension to form a groove 11 for fitting the packing 3. The groove 11 is formed in the riser part 14. The groove 11 is formed annularly in planar view to surround an outer edge of the first case 1. Note that the specific shape of the groove 11 is described later. Bolt holes 5 are formed in four corners of the first case 1 outward of the riser part 14.

Figure 3:
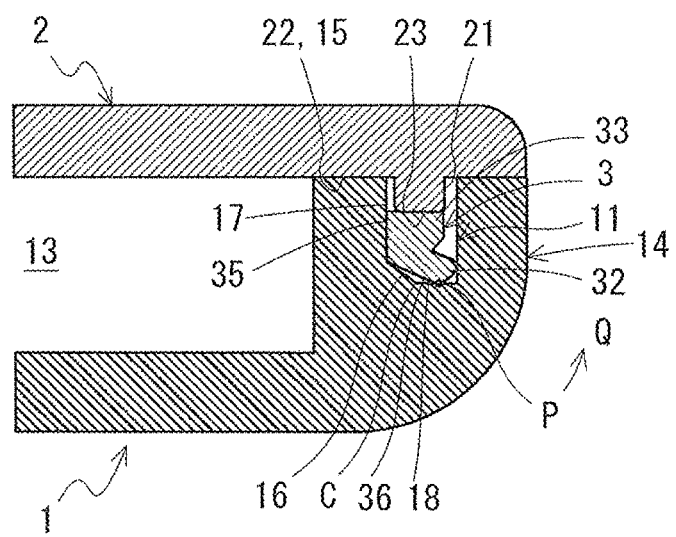
FIG. 3 is a cross-sectional diagram showing a state after the second case pushes the packing in the waterproof structure according to the first exemplary embodiment of the present invention.

The second case 2 is a lid component that covers the opening of the first case 1 in order to form a sealed space with the first case 1. As shown in FIG. 2, at least a region 22 is formed in a plane, which comes into contact with the upper surface 15 of the riser part 14 of the first case 1 when the second case 2 is disposed to cover the first case 1. Therefore, as shown in FIG. 3, when the second case 2 covers the first case 1, the upper surface 15 of the riser part 14 of the first case 1 and the region 22 of the second case 2 come into contact on their surfaces.

The second case 2 is formed in a planar shape that is substantially equivalent to the first case 1. As shown in FIG. 2, a protrusion 21 that pushes the packing 3 is formed at a position corresponding to the groove 11 in the first case 1. The protrusion 21 is also formed annularly in planar view. A lower surface 23 of the protrusion 21 is formed to be a substantially parallel surface to the region 22.

The width dimension of the protrusion 21 is set to enable the protrusion 21 to be inserted into the groove 11 in the first case 1. Moreover, although mentioned later for details, the height of the protrusion 21 is set to enable a bending part 32 to bend in a bending direction (direction indicated by an arrow Q (outward direction of the first case 1)) of the bending part 32 of the packing 3 from the state of FIG. 2 to the state of FIG. 3.

The packing 3 is disposed in the groove 11 in the first case 1, as shown in FIGS. 1, 2 and the like. That is, the packing 3 is formed annularly to conform to the shape of the groove 11 in the first case 1. The packing 3 is a resin molding such as rubber with elasticity. As shown in FIG. 2, the packing 3 includes the bending part 32 and a base part 33.

The base part 33 is formed to be a substantially rectangular shape when viewed in cross section. The bending part 32 protrudes from a lower end of the base part 33. Specifically, the bending part 32 protrudes at a predetermined angle from a corner inward of the first case 1 on the lower end of the base part 33. The thickness of the bending part 32 on a connection part with the base part 33 is set in such a manner that the bending part 32 rotates in the bending direction when pushed from above by the protrusion 21 of the second case 2, and the bending part 32 extends obliquely downward with its thickness. That is, the bending part 32 protrudes in a tongue shape from the lower end of the base part 33.

A tip of the bending part 32 is formed in a roundish shape to slide well on a guiding part 16 and a bottom surface 18 of the groove 11, as described later. Note that a cutout 34 is formed in the lower end of the base part 33 so as not to hinder the bending part 32 from bending.

In regard to the packing 3 configured as above, as shown in FIG. 2, in the state where the packing 3 is disposed in the groove 11 and the packing 3 is not yet pushed by the protrusion 21 of the second case 2, a contact point P, which is between the tip of the bending part 32 of the packing 3 and the bottom surface 1 8 of the groove 11 in the first case 1, is disposed on a straight line N that passes through a bending point O (bottom part of constriction) of the bending part 32 and is substantially orthogonal to the lower surface 23 of the protrusion 21 of the second case 2, or placed offset from the straight line N toward the bending direction of the bending part 32.

The shape of the groove 11 in the first case 1 is explained here. The groove 11 is formed in a substantially rectangular shape when viewed in cross section, as shown in FIG. 2. As shown in FIG. 3, the width dimension of the groove 11 is set to allow the bending part 32 of the packing 3 to rotate well in the bending direction. Moreover, the depth of the groove 11 is set in such a manner that when the packing 3 disposed in the groove 11 is pushed by the protrusion 21 of the second case 2, the base part 33 is not substantially compressed, the bending part 32 rotates in the bending direction, and the amount of push by the protrusion 21 is absorbed. A bottom part of this groove 11 includes the guiding part 16 that guides the tip of the bending part 32 of the packing 3 to a predetermined position.

The guiding part 16 is a sloping surface that continuously slopes downward from an inward surface 17 of the groove 11 to the bottom surface 18 of the groove 11. As shown in FIG. 2, an intersection C between the guiding part 16 and the bottom surface 18 is set to a position in such a manner that when the packing 3 is disposed in the groove 11 in a state where the bending direction of the bending part 32 of the packing 3 faces outwardly of the first case 1, and then a surface 35 (a surface of the base part 33 inward of the first case 1 in this exemplary embodiment), which is a surface of the base part 33 of the packing 3 opposite to the bending direction of the bending part 32, comes into contact with the inward surface 17 of the groove 11, the tip of the bending part 32 of the packing 3 comes into contact with the bottom surface 18 of the groove 11. However, the intersection C may be offset outwardly or inwardly of the first case 1, in short, the intersection C should only be capable of guiding the bending part 32 of the packing 3 to bend in the intended bending direction. An inclination angle of the guiding part 16 is set to allow the tip of the bending part 32 of the packing 3 to slide and be guided when the packing 3 is disposed in the groove 11.

The first case 1, the second case 2, and the packing 3 configured in this way realize the waterproof structure as stated below.

As shown in FIG. 2, in the state where the bending direction of the bending part 32 of the packing 3 faces outwardly of the first case 1, the packing 3 is disposed in the groove 11 in the first case 1. At this time, the tip of the bending part 32 of the packing 3 slide on the guiding part 16 and is guided to the intersection C. Moreover, the surface 35 of the base part 33 of the packing 3 that is opposite to the bending direction of the bending part 32 comes into contact with the surface 17 of the groove 11 inward of the first case 1. That is, the packing 3 is positioned in the state where the packing 3 leans on the surface 17 of the groove 11 inward of the first case 1.

Although the protrusion 21 of the second case 2 pushes the packing 3 in this state, immediately before the push, the intersection C where the tip of the bending part 32 is located is placed on the straight line N, which passes through the bending point O of the bending part 32 and is substantially orthogonal to the lower surface 23 of the protrusion 21 of the second case 2, or placed offset from the straight line N toward the bending direction of the bending part 32.

The protrusion 21 of the second case 2 is disposed above the packing 3. The protrusion 21 of the second case 2 pushes the packing 3. Then, in the packing 3, the base part 33 is hardly compressed, and the bending part 32 rotates in the bending direction and becomes the state shown in FIG. 3. At this time, the contact point P between the tip of the bending part 32 of the packing 3 and the bottom surface 18 of the groove 11 moves outwardly of the first case 1 while a surface 36 (a surface of the bending part 32 inward of the first case 1 in this exemplary embodiment), which is a surface of the bending part 32 opposite to the bending direction, comes into contact with the guiding part 16. This therefore can stabilize the packing 3 in the groove part 11. This further increases a contact area between the packing 3 and the groove 11, thereby improving waterproof performance.

Lastly, bonding the first case 1 and the second case 2 by the bolts 4 realizes the waterproof structure.

In such a waterproof structure, the guiding part 16 can guide the tip of the bending part 32 of the packing 3 to the predetermined position (intersection C) on the bottom surface 18 of the groove 11. This therefore facilitates positioning of the packing 3 in the groove 11. Thus, when the protrusion 21 of the second case 2 pushes the packing 3, the bending part 32 of the packing 3 will not rotate in an unintended direction. This prevents damage to the packing 3 and improves the productivity of electronic devices with excellent waterproof performance.

Further, as the rotation of the bending part 32 of the packing 3 absorbs the amount of push by the protrusion 21 of the second case 2, a reaction force is hardly generated in the packing 3. As it is almost unnecessary for the first case 1 and the second case 2 to counter the reaction force of the packing 3, the size of the first case 1 and the second case 2 can be reduced and the first case 1 and the second case 2 can be simplified.

Incidentally, in the packing 3 of this exemplary embodiment, the bending direction of the bending part 32 faces outwardly of the first case 1. That is, it is hard for the bending part 32 to rotate inwardly of the first case 1. For this reason, in case of water ingress from outside the first case 1 into the groove 11, the bending part 32 functions as a valve to prevent the water ingress.

[Second Exemplary Embodiment]

Although in the packing 3 of the first exemplary embodiment, the bending direction of the bending part 32 faces outwardly of the first case 1, a substantially similar operation can be achieved when the bending direction of the bending part 32 faces inwardly of the first case 1.

Figure 4:
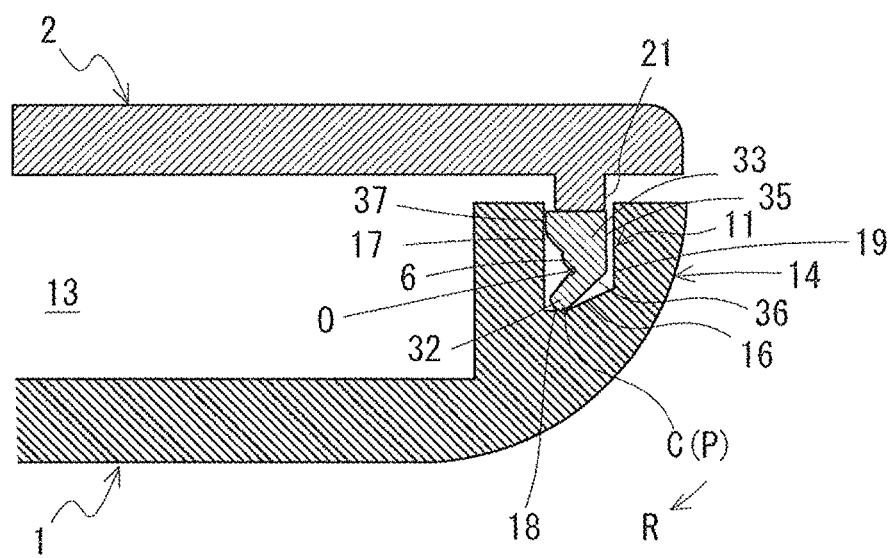
FIG. 4 is a cross-sectional diagram showing a state before a second case pushes a packing in a waterproof structure according to a second exemplary embodiment of the present invention.

That is, as shown in FIG. 4, in the state where the bending direction of the bending part 32 of the packing 3 faces inwardly of the first case 1, the packing 3 is disposed in the groove 11 in the first case 1. Also in this case, the guiding part 16 of the groove 11 in the first case 1 is formed in such a manner that the tip of the bending part 32 of the packing 3 is disposed at a predetermined position on the bottom surface of the groove 11 when the packing 3 is disposed in the groove 11 in the first case 1.

Specifically, the guiding part 16 is a sloping surface that continuously slopes downward from a surface 19, which is a surface of the groove 11 outward of the first case 1, to the bottom surface 18. As shown in FIG. 4, the intersection C between the guiding part 16 and the bottom surface 18 is set to a position in such a manner that when the packing 3 is disposed in the groove 11 in a state where the bending part 32 of the packing 3 faces inwardly of the first case 1, and then a surface 37 (a surface of the base part 33 inward of the first case 1 in this exemplary embodiment), which is a surface of the base part 33 of the packing 3 on the bending direction of the bending part 32, comes into contact with the surface 17 of the groove 11 inward of the first case 1, the tip of the bending part 32 of the packing 3 comes into contact with the bottom surface 18 of the groove 11. However, the intersection C may be offset outwardly or inwardly of the first case 1, in short, the intersection C should only be capable of guiding the bending part 32 of the packing 3 to bend in the intended bending direction.

Figure 5:
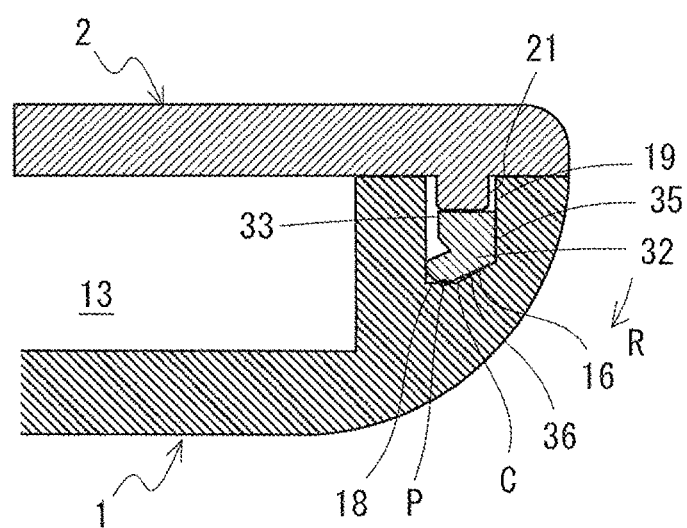
FIG. 5 is a cross-sectional diagram showing a state after the second case pushes the packing in the waterproof structure according to the second exemplary embodiment of the present invention.

Then, when the packing 3 is disposed in the groove 11 in the first case 1, the guiding part 16 can guide the tip of the bending part 32 of the packing 3 to the predetermined position (intersection C) on the bottom surface 18 of the groove 11. In a similar manner as the first exemplary embodiment, when the protrusion 21 of the second case 2 pushes the packing 3, the base part 33 is hardly compressed, and the bending part 32 rotates in the bending direction (direction indicated by an arrow R) and becomes the state shown in FIG. 5. At this time, the contact point P between the tip of the bending part 32 of the packing 3 and the bottom surface 18 of the groove 11 moves inwardly of the first case 1 while the surface 36 (the surface of the bending part 32 outward of the first case 1 in this exemplary embodiment), which is the surface of the bending part 32 opposite to the bending direction, comes into contact with the guiding part 16. Moreover, the surface 35 (the surface of the base part 33 outward of the first case 1 in this exemplary embodiment), which is the surface of the base part 33 of the packing 3 that is opposite to the bending direction of the bending part 32, comes into contact with the surface 19 of the groove 11 outward of the first case I.

Incidentally, when the bending part 32 of the packing 3 is disposed facing inwardly of the first case 1, the bending part 32 can easily rotate inwardly of the first case 1. Therefore, in case of water ingress from outside the first case 1 into the groove 1, the bending part 32 is pushed by the water and rotates in the bending direction, thereby resulting in allowing the water ingress inside the first case 1. For this reason, it is preferable to reinforce the vicinity of the bending point O of the bending part 32 by padding 6 and the like. This enables prevention of the water ingress inside the first case 1.

[Third Exemplary Embodiment]

Figure 6:
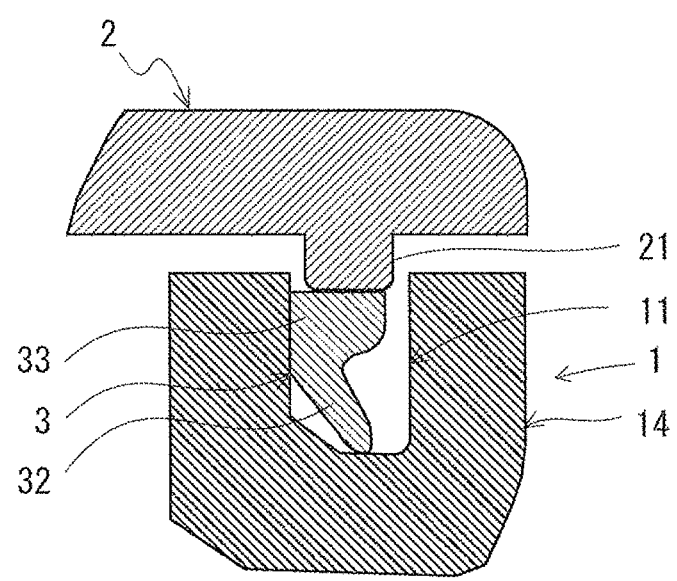
FIG. 6 is a cross-sectional diagram showing a state before a second case pushes a packing in a waterproof structure according to a third exemplary embodiment of the present invention.

Although the tip of the bending part 32 of the packing 3 according to the first and second exemplary embodiments is formed in a roundish shape, the tip of the bending part 32 may be formed sharply, as shown in FIG. 6. This reduces a contact area between the tip of the bending part 32 and the guiding part 16 and the bottom surface 18 of the groove 11, thereby reducing friction when the tip of the bending part 32 slide.

[Fourth Exemplary Embodiment]

Figure 7:
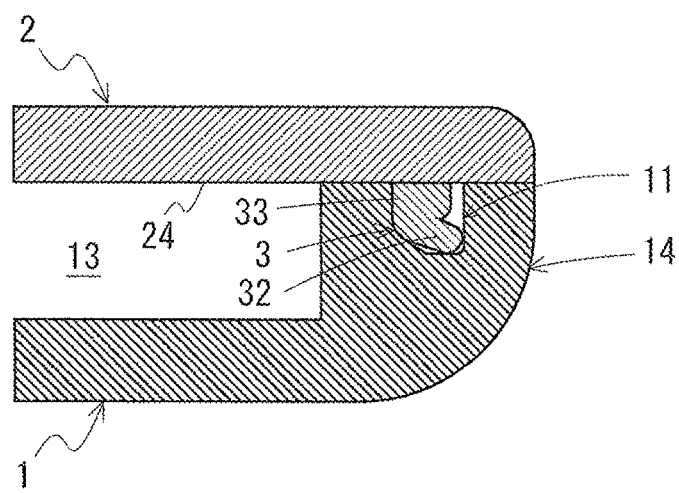
FIG. 7 is a cross-sectional diagram showing a state after a second case pushes a packing in a waterproof structure according to a fourth exemplary embodiment of the present invention.

Although in the first to third exemplary embodiments, the protrusion 21 of the second case 2 pushes the packing 3, the protrusion 21 may be eliminated and the lower surface 24 of the second case 2 may push the packing 3. In such a case, the height of the packing 3 is set to be greater than the height of the groove 11. Further, the packing 3 is set in such a manner that when the packing 3 is pushed by the lower surface 24 of the second case 2, the base part 33 of the packing 3 is hardly compressed, and the bending part 32 rotates in the bending direction to absorb the amount of protrusion from the groove 11 in the packing 3, as shown in FIG. 7.

Such a configuration reduces the height of the groove 11, thereby enabling reduction in the thickness of the waterproof structure and eventually the thickness of the electronic device.

The present invention is not limited to the above exemplary embodiments but can be modified as appropriate without departing from the scope.

In the above exemplary embodiments, the tip of the bending part 32 is formed in a roundish shape or sharply in order to reduce sliding resistance of the tip of the bending part 32 of the packing 3, however, it is not limited to this. Specifically, the vicinity of the tip of the bending part 32 may be grained. Unevenness is formed on the vicinity of the tip of the bending part 32 by graining, and this reduces the friction with the guiding part 16 and the bottom surface 18 of the groove 11.

Moreover, a lubricant such as oil may be applied to the vicinity of the tip of the bending part 32 and the guiding part 16 and the bottom surface 18 of the groove 11.

Further, the vicinity of the tip of the bending part 32 may be formed of a material including a lubricant.

Incidentally, a following configuration using the above packing 3 can also realize the waterproof structure.

Figure 8:
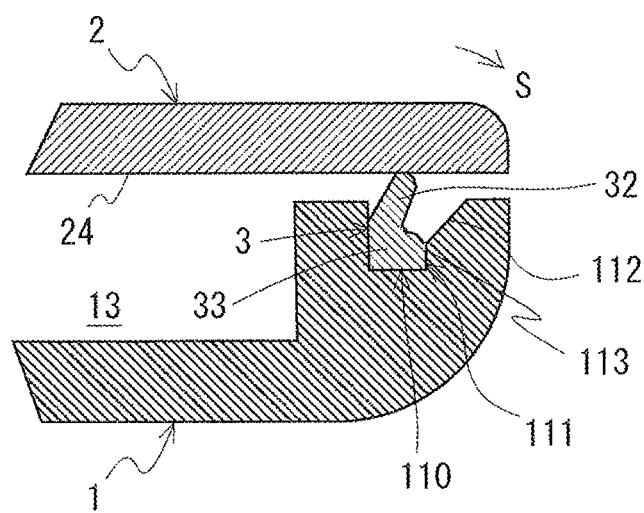
FIG. 8 is a cross-sectional diagram showing a state before a second case pushes a packing in a different waterproof structure.
Figure 9:
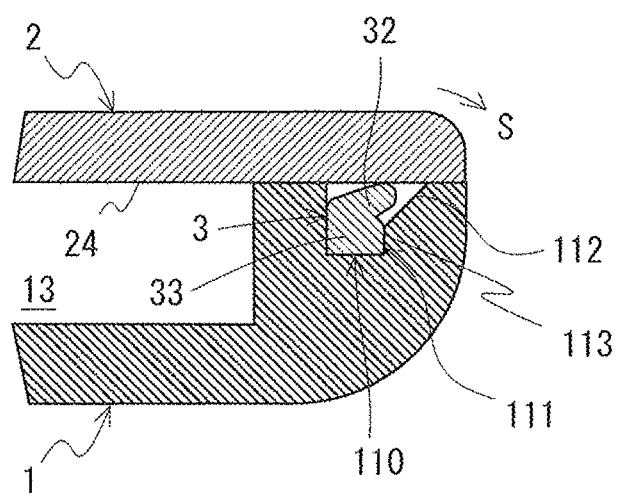
FIG. 9 is a cross-sectional diagram showing a state after the second case pushes the packing in the different waterproof structure.

In the waterproof structure shown in FIGS. 8 and 9, the packing 3 of the first exemplary embodiment is disposed upside down. Specifically, as shown in FIG. 8, the bending part 32 of the packing 3 is disposed in a state not pushed by the second case 2 and facing obliquely upward and also outwardly (may be inwardly) of the first case 1. As shown in FIG. 9, this packing 3 is pushed by the lower surface 24 of the second case 2, in a similar manner as the fourth embodiment. Therefore, the height of the packing 3 is set to be greater than the height of a groove 110 in the first case 1. However, as with the packing 3 of the first and second exemplary embodiments, the packing 3 may be pushed by the protrusion 21 of the second case 2.

The groove 110 in the first case 1 includes a restraining part 111 and a relief part 112. The base part 33 of the packing 3 is fitted in the restraining part 111. The width dimension and height of the restraining part 111 are set to restrain the base part 33 well. This enables positioning of the packing 3 only by fitting the packing 3 in the restraining part 111 of the groove 110.

The relief part 112 is formed in such a manner that the bending part 32 does not interfere the groove 110 when the bending part 32 of the packing 3 rotates in the bending direction. The relief part 112 of this exemplary embodiment is formed continuously with a surface 113 of the restraining part 111 that is outward of the first case 1 obliquely upward and also outwardly of the first case 1. However, the shape of the relief part 112 is not especially limited, in short, the relief part 112 should only be formed in such a manner that the bending part 32 does not interfere the groove 11 when the bending part 32 rotates in the bending direction.

The base part 33 of the packing 3 is fitted in the restraining part 111 of the groove 110 in the first case 1 with such a configuration in the state that the bending part 32 of the packing 3 faces obliquely upward and also outwardly of the first case 1. When the second case 2 is disposed to cover the opening of the first case 1 from above, as shown in FIG. 9, the packing 3 is pushed by the lower surface 24 of the second case 2 and the bending part 32 of the packing 3 rotates in a direction indicated by an arrow S, and the vicinity of the tip of the bending part 32 moves into the relief part 112 of the groove 110. Since the base 33 does not move in the up-and-down direction at this time unlike the packing 3 of the first to fourth exemplary embodiments, it is possible to prevent the packing 3 from deteriorating. Additionally, as the width dimension of the restraining part 111 of the groove 110 can be substantially equivalent to that of the base part 33 of the packing 3, the width dimension of the groove 110 can be less than that of the groove 11 according to the first to fourth exemplary embodiments.

Even when the packing 3 is used upside down in this way, as shown in FIG. 9, the bending part 32 of the packing 3 comes into contact with the lower surface 24 of the second case 2, and the base part 33 of the packing 3 is firmly fitted in the restraining part 111 of the groove 110, thereby enabling prevention of water ingress from outside the first case 1.

Figure 10:
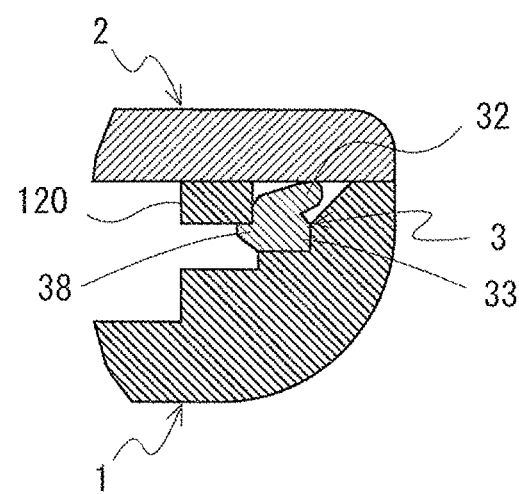
FIG. 10 is a cross-sectional diagram showing a state after a second case pushes a packing in another different waterproof structure.
Figure 11:
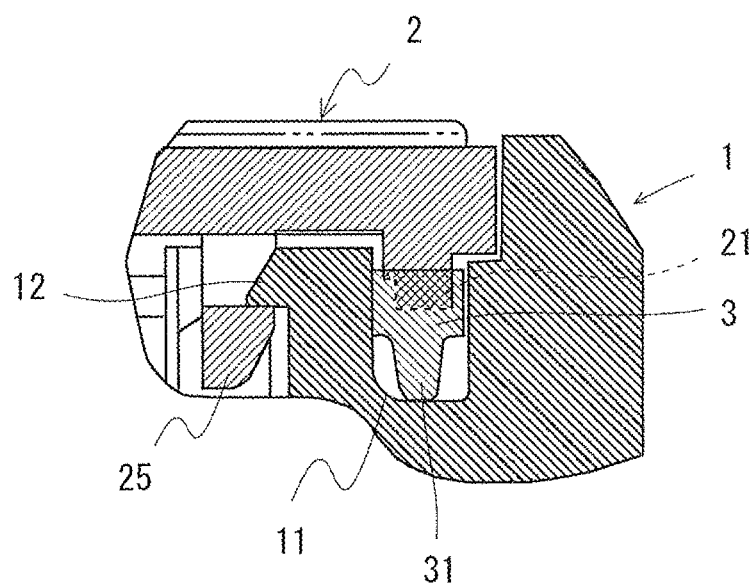
FIG. 11 is a cross-sectional diagram showing a related waterproof structure.
Figure 12:
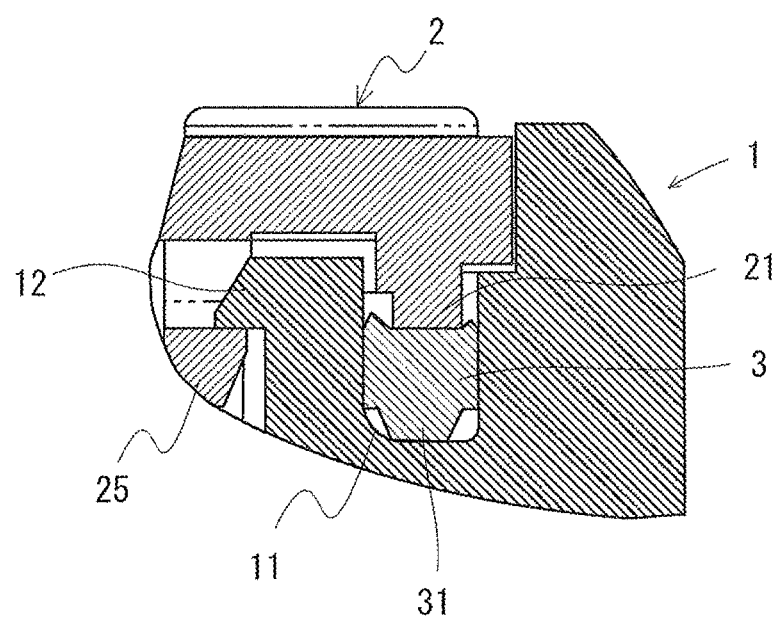
FIG. 12 is a cross-sectional diagram showing the related waterproof structure.

Incidentally, as shown in FIG. 10, a configuration can be employed in which a pawl 38 protrudes from the base part 33 of the packing 3, and the pawl 38 is hooked on a hook piece 120 formed to the first case 1 to fix the packing 3. This enables elimination a part of the riser part 14 inward of the first case 1.

The present application claims priority rights of and is based on Japanese Patent Application No. 2010-284625 filed on Dec. 21, 2011 in the Japanese Patent Office, the entire contents of which are hereby incorporated by reference.

Industrial Applicability

The present invention can be preferably used for a waterproof structure of electronic devices such as cell phones, smart phones, PDAs (Personal Digital Assistants), and tablet PCs (Personal Computers).

Reference Signs List

1 FIRST CASE
2 SECOND CASE
3 PACKING
4 BOLT
5 BOLT HOLE
6 PADDING
11 GROOVE
12 PAWL OF FIRST CASE
13 SPACE
14 RISER PART

15 UPPER SURFACE OF RISER PART
16 GUIDING PART
17 INWARD SURFACE OF GROOVE
18 BOTTOM SURFACE OF GROOVE
19 OUTWARD SURFACE OF GROOVE
21 PROTRUSION
22 REGION OF SECOND CASE TO BE IN CONTACT WITH RISER PART OF FIRST CASE
23 LOWER SURFACE OF PROTRUSION
24 LOWER SURFACE OF SECOND CASE
25 PAWL OF SECOND CASE
31 PROTRUSION OF PACKING
32 BENDING PART OF PACKING
33 BASE PART OF PACKING
34 CUTOUT OF BASE PART
35 SURFACE OF BASE PART OPPOSITE TO BENDING DIRECTION OF BENDING PART
36 SURFACE OF BENDING PART OPPOSITE TO BENDING DIRECTION
37 SURFACE OF BASE PART ON BENDING DIRECTION OF BENDING PART
38 PAWL OF PACKING
110 GROOVE
111 RESTRAINING PART
112 RELIEF PART
113 SURFACE OF RESTRAINING PART OUTWARD OF FIRST CASE
120 HOOK PIECE

The invention claimed is:

1. A waterproof structure comprising:
a first case including a groove formed therein;
a packing that is disposed in the groove; and
a second case configured to push the packing and form a sealed space with the first case,
wherein the packing includes a base part and a bending part, the bending part protruding obliquely downward from a corner on a lower surface of the base part, the corner being located on an inner side of the first case, a bending direction of the bending part pointing at an outer side of the first case, and
the groove includes an inclined surface as a guiding part, the inclined surface being configured to cause a tip of the bending part to slide down the inclined surface to a predetermined position on a bottom surface of the groove in the first case toward the outer side of the first case, the bottom surface of the groove continuously extending from the guiding part toward the outer side of the first case, and
in a state in which (1) the packing is not pushed in the second case, and (2) a surface, which is on the inner side of the first case, of the base part of the packing is in contact with a surface, on the inner side of the first case, of the groove,
a contact point between the tip of the bending part and the bottom surface of the groove of the first case is positioned on a straight line that passes through a bending point of the bending part and is approximately perpendicular to a contact surface with the packing in the first case, or positioned in an area of the first case located on an outer side of the straight line.

2. The waterproof structure according to claim 1, wherein the guiding part is a sloping surface.

3. The waterproof structure according to claim 1, wherein the guiding part comes into contact with a surface of the bending part of the packing opposite to the bending direction while the packing is pushed by the second case.

4. The waterproof structure according to claim 1, wherein the tip of the bending part is formed unrounded.

5. The waterproof structure according to claim 1, wherein the tip of the bending part is grained to provide unevenness on the tip.

6. The waterproof structure according to claim 1, wherein the tip of the bending part is configured to be guided by the inclined surface to the predetermined position on the bottom surface of the groove.

7. A terminal comprising:
a first case including a groove formed therein;
a packing that is disposed in the groove; and
a second case configured to push the packing and form a sealed space with the first case,
wherein the packing includes a base part and a bending part, the bending part protruding obliquely downward from a corner on a lower surface of the base part, the corner being located on an inner side of the first case, a bending direction of the bending part pointing at an outer side of the first case, and
the groove includes an inclined surface as a guiding part, the inclined surface being configured to cause a tip of the bending part to slide down the inclined surface to a predetermined position on a bottom surface of the groove in the first case toward the outer side of the first base, the bottom surface of the groove continuously extending from the guiding part toward the outer side of the first case, and
in a state in which (1) the packing is not pushed in the second case, and (2) a surface, which is on the inner side of the first case, of the base part of the packing is in contact with a surface, on the inner side of the first case, of the groove,
a contact point between the tip of the bending part and the bottom surface of the groove of the first case is positioned on a straight line that passes through a bending point of the bending part and is approximately perpendicular to a contact surface with the packing in the first case, or positioned in an area of the first case located on an outer side of the straight line.

8. The terminal according to claim 7, wherein the tip of the bending part is configured to be guided by the inclined surface to the predetermined position on the bottom surface of the groove.

* * * * *